Patented Oct. 1, 1929

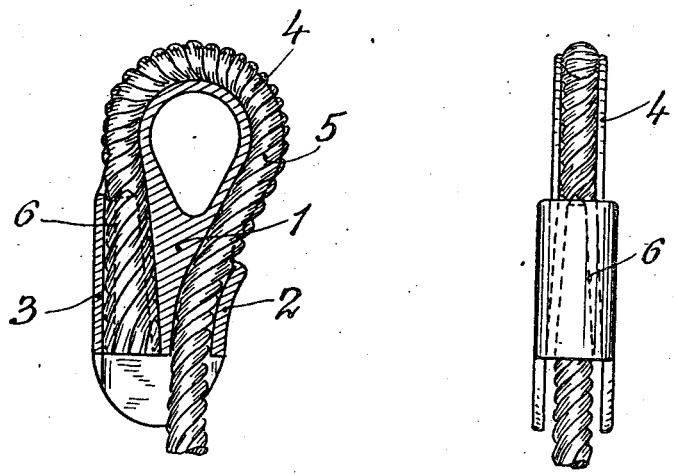

1,729,945

UNITED STATES PATENT OFFICE

CARL JULIANUS HOLM, OF TRONDHJEM, NORWAY

WIRE CLAMP

Application filed May 20, 1929, Serial No. 364,646, and in Germany October 11, 1926.

The present invention has for its object a device for clamping two wires or two parts of the same wire together, with the object of connecting two pieces of wire with each other or to form a loop at the end of a wire or to secure the end of a wire to a thimble.

The device in accordance with the present invention comprises a body of iron, steel or other suitable material provided with two approximately parallel channels, through which the wire or wires to be clamped may be passed, the axis of at least one of said channels being curved, whereas on the other hand at least one of the channels is made conical on part of its length. For certain purposes both of the channels in said body of metal may be given a conical shape on part of their length, and also in some cases both channels may be formed with a curved axis.

On the drawing two embodiments of the invention are illustrated.

Fig. 1 shows a longitudinal sectional view of a thimble constructed in accordance with the present invention.

Fig. 2 is a side view of the same.

The thimble in accordance with Figs. 1 and 2 comprises a block of metal 1 provided with a curved channel 2 and a straight conical channel 3 approximately parallel to part of the curved channel 2.

An eye member 4 having a U-shaped or semi-circular cross section, is formed integrally with the block 1 in such a manner that the channel of the said eye member forms a continuation of the channels 2 and 3 in block 1.

In order to fasten a wire to the said thimble, the wire 5 is passed through channel 2 round the eye member 4 so as to fit into the channel thereof, and then the free end of the wire is passed through the conical channel 3 so that a short piece of the wire extends beyond the broad end of said conical channel.

Now the core of the wire is removed on a certain length from the free end inwards and a conical plug 6 is driven into the wire from that end, as illustrated on the drawing, so as to press the strands of the wire against the conical inside surface of the said conical channel.

After the conical plug has been hammered in, the end of the wire is cut flush with the broad end of channel 3, so that no part of the wire extends beyond the channel.

The best result is obtained when the plug is formed of a material which is softer than the strands of the wire (soft iron, copper, aluminium or the like), as this acts to distribute the pressure between the plug and the wire strands more evenly.

Claim:

A device for clamping the end portion of a cable in the form of a loop, comprising a unitary eye member having an external peripheral groove formed about one end thereof, said member being formed with adjacent bores opening through its opposite end, the axes of which bores merge with the axis of said groove at opposite ends of said groove, one of said bores being flared toward the end of the said member, through which said bore opens, and a tapered plug adapted to be buried within the spread strands at the end of a cable after the latter has been passed through said bores and around said groove with its end adjacent said flared bore, said plug affording means for wedging said spread end within said flared bore.

In testimony whereof I affix my signature.

CARL JULIANUS HOLM.